United States Patent [19]

Goell et al.

[11] 4,118,100

[45] Oct. 3, 1978

[54] OPTICAL COUPLERS FOR LIGHT EMITTING DIODES AND DETECTORS

[75] Inventors: James E. Goell, Roanoke, Va.; H. David Brandt, Hamilton, Mass.

[73] Assignee: International Telephone and Telegraph Corporation, Nutley, N.J.

[21] Appl. No.: 639,544

[22] Filed: Dec. 10, 1975

[51] Int. Cl.² ............................................. G02B 5/14
[52] U.S. Cl. ............................. 350/96.20; 250/552; 250/227
[58] Field of Search ................ 350/96 C, 96 WG; 250/227, 552

[56] References Cited

U.S. PATENT DOCUMENTS

| | | | |
|---|---|---|---|
| 3,800,388 | 4/1974 | Börner et al. | 350/96 C X |
| 3,808,549 | 4/1974 | Maurer | 350/96 WG X |
| 3,932,761 | 1/1976 | Ramsey et al. | 250/552 |
| 3,948,582 | 4/1976 | Martin | 350/96 C |

OTHER PUBLICATIONS

Hoss; R. and Weigl, F; "A Fiber Optically Linked 100 Channel Voice Intercom", Topical Meeting on Optical Fiber Transmission, Jan. 7-9, 1975, Williamsburg, Va., pp. ThA5-1-4.

Primary Examiner—John K. Corbin
Assistant Examiner—Rolf Hille
Attorney, Agent, or Firm—John T. O'Halloran; Peter C. Van Der Sluys

[57] ABSTRACT

An optical coupler is provided for connecting between optical fibers and electro-optical elements in optical communication systems. The coupler comprises one element consisting of a connector fiber within a support tube fixedly attached to the electro-optical elements at one end and optically polished at the other end. Connection between the connector fiber and an optical communication fiber is provided by means of a second element consisting of a dual diameter connector tube. The dual diameter tube slidingly engages the support tube at one end and the systems fiber at an opposite end to provided close optical proximity between the systems fiber and the connector fiber.

11 Claims, 8 Drawing Figures

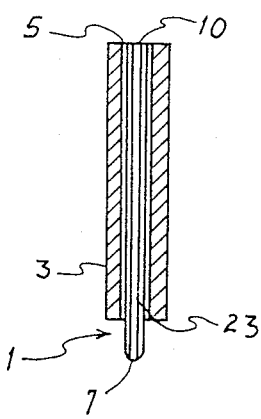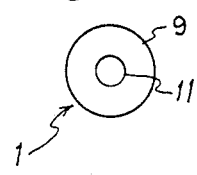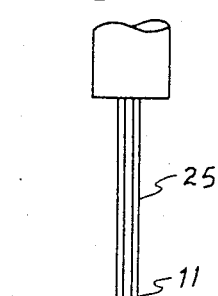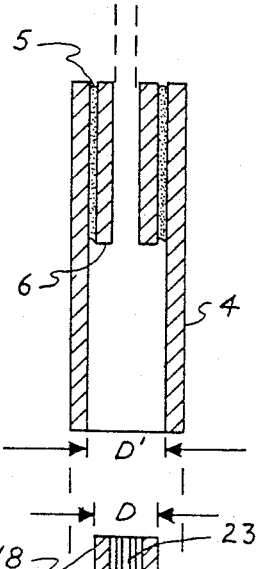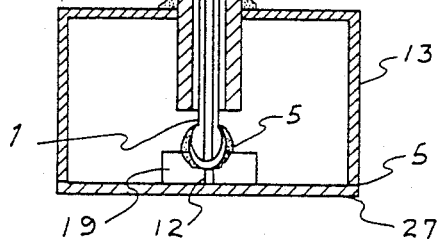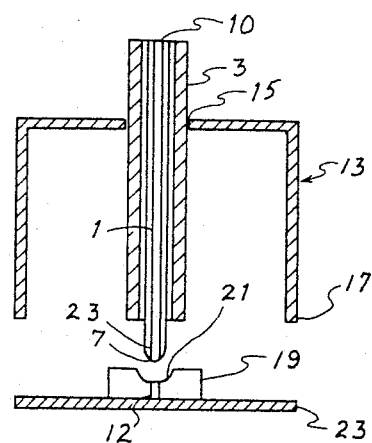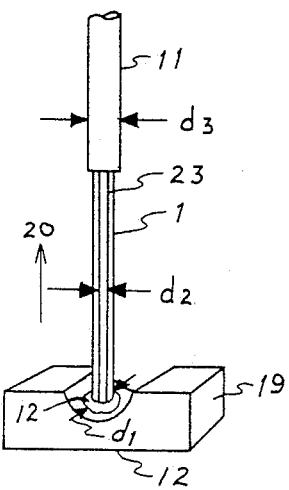

OPTICAL COUPLERS FOR LIGHT EMITTING DIODES AND DETECTORS

BACKGROUND OF THE INVENTION

Coupling between electro-optical elements and optical communications fibers has heretofore been provided by splicing the system fiber to a short piece of optical fiber cemented to the electro-optical elements at one end and to another short piece of optical fiber cemented to the electro-optical element at the other end of the fiber. In an optical communications system consisting of a light emitting diode and a light detector, for example, a short length of optical fiber would be cemented to the light emitting diode at one end and to the light detector at the opposite end. The rigid attachment between the optical fiber and the electro-optical element causes many obvious disadvantages. The major disadvantage of this arrangement is the extreme fragility of the short optical fiber which causes the fiber to break in the event that pressure is inadvertently applied to the fiber during installation or operation.

The purpose of this invention is to provide a coupler for connecting between electro-optical elements and system fibers whereby electro-optical elements can be rapidly installed or replaced with minimum risk of damage.

SUMMARY OF THE INVENTION

A coupler for connecting between optical fibers and electro-optical elements in optical communication systems utilizes a support tube fixedly attached to a connector fiber in combination with a connector tube removably connecting between the support tube and a systems fiber for providing optical coupling between the connector fiber and the systems fiber.

One embodiment provides improved optical continuity between the electro-optical element and the systems fiber by means of a connector fiber having a core diameter intermediate the dimensions of the active region of the electro-optical element and the core diameter of the systems fiber.

BRIEF DESCRIPTION OF THE DRAWINGS

FIG. 1A is a side sectional view of the connector fiber within a support tube according to this invention;

FIG. 1B is a cross-section of the connector fiber of FIG. 1A;

FIG. 2 is a side sectional view of the connector fiber and support tube of FIG. 1A before connecting with an electro-optical element;

FIG. 3A is an exploded side sectional view of the connector fiber and support tube of FIG. 2 and a connector tube for providing the electro-optical coupler of this invention;

FIG. 3B is an enlarged top perspective view of a systems fiber coupled with the connector fiber and electro-optical element according to this invention;

DESCRIPTION OF THE PREFERRED EMBODIMENT

Figure 4:
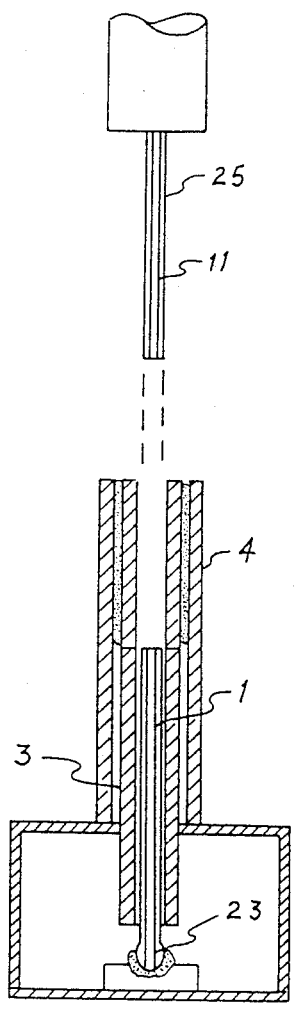
FIG. 4 is a side sectional view of the connector fiber and support tube connected with the connector tube of FIG. 3A according to this invention.

One element of the coupler of this invention can be seen by referring to FIG. 1A. A clad optical connector fiber 1 having the cross-section shown in FIG. 1B is inserted within a support tube 3, made of metal, plastic or glass, and is fixedly attached by means of a thin layer of epoxy resin 5. The coupler element of FIG. 1A can be produced by coating a fiber preform and drawing down to produce the coupling fiber with an integral support tube. One connector fiber end 10 is optically polished for providing good optical continuity when the connector fiber 1 is attached to the coupler. The other connector fiber end 7 is rounded in order to conform to the contour of a Burrus-type light emitting diode.

FIG. 2 shows the connector fiber 1 within the support tube 3 inserted through the aperture 15 of a light emitting diode cap 13. The support tube 3 can be produced by coating the coupling fiber 1. In order to secure the support tube 3 to a light emitting diode 19 of the type having an active region 12 within a cavity 21 the polished fiber end 10 is exposed to a light detector and the light emitting diode is excited to generate light. The support tube 3 is then bought into contact with and moved relative to the active region 12 until a maximum light response is recorded on the light detector (not shown). At this point a small amount of an adhesive such as an epoxy resin is applied at the rounded fiber end 7 and allowed to cure. The diode cap 13 is then brought into contact with the header 23 and is attached to the header by means of a small quantity of epoxy resin 5. The cap can also be soldered or welded to either the first coupling or the header. This structure, shown on FIG. 3A, comprises one part of the optical coupler according to this invention. The connector tube 4, made of metal, plastic or glass, having an inner diameter D' corresponding to the outer diameter D of the support tube 3 tightly fits over the support tube 3 when the inner surface of the connector tube 4 is precision machined for close tolerance clearance. The connector tube can be produced by sliding a first tube part way into a second tube where the first tube's outside diameter is slightly smaller than the second tube's inside diameter. The tube 4 can also be a shrinkable tube. When connector tube 4 slidingly encompasses support tube 3 to bring the bottom of the connector tube inner member 6 into contact with the support tube top 18 the electro-optical coupler is ready for the insertion of core 11 of systems fiber 25.

FIG. 4 shows the connector tube 4 coupled with the support tube 3 and indicates the good optical alignment available between connector fiber core 23 and core 11 of the systems fiber 25.

In order to promote good optical alignment between the Burrus-type light emitting diode 19 and the core 11 of systems fiber 25 the core diameter $d_2$ of the connector fiber core 23 is chosen intermediate in size between the diameter $d_1$ of the light emitting diode active region 12 and the diameter $d_3$ of the systems fiber core 11. In this embodiment light transmits in the direction indicated by arrow 20 so that light readily transmits from the small light emitting region 12 into a somewhat larger connector fiber core 23 and in turn transmits into an even larger diameter systems fiber core 11.

In the event that the electro-optical element to be coupled to the systems fiber 25 is of the light detection type then it is advantageous to have the connector fiber core diameter $d_2$ intemediate in size between the diameter $d_1$ of the detector active region 16 of the light detector 14 and the diameter $d_2$ of the systems fiber core 11. In this application light transmits from the systems fiber core through the connector fiber 1 to the detector active region 16 as indicated by directional arrow 22. Light therefore transmits into progressively larger areas so that optical losses at the interface between each optical element are at a minimum.

Figure 5A:
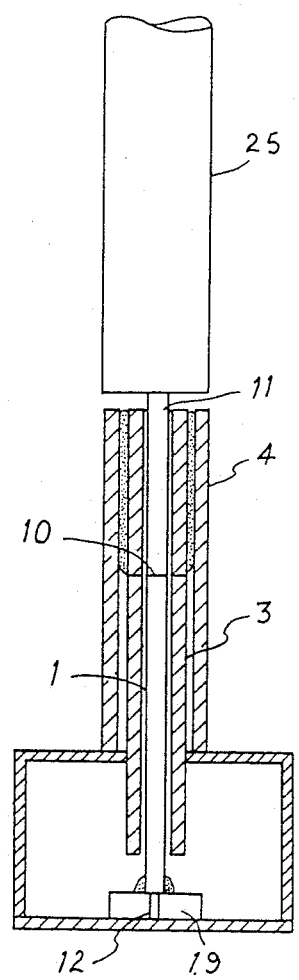
FIG. 5A is a side sectional view of a systems fiber connected with the coupler of FIG. 4.
Figure 5B:
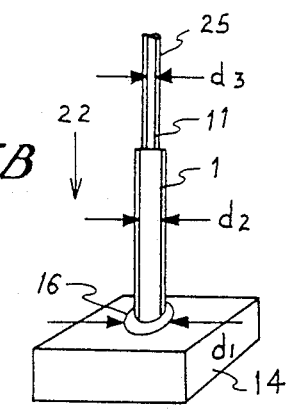
FIG. 5B is an enlarged top perspective view of an alternate embodiment of the coupling arrangement of FIG. 3B.

Since either an optical emitting element such as the Burrus-type light emitting diode 12 of FIG. 3B or a light detecting element such as a PIN diode, for example, as indicated in FIG 5B may be connected with the connector fiber 1, the electro-optical coupler of this invention provides multi-functional application. The systems fiber 25 as shown in FIG. 5A connected with the connector tube 4 and optically coupled with connector fiber 1 and the light emitting diode 19 tube 3 could also be connected within the same electro-optical coupler arrangement with a light detector substituted for the light emitting diode 19. A coupler at one end of a systems fiber 25 could contain a light emitter, for example, and at the opposite end of the same fiber contain a light detector. When a plurality of electro-optical couplers are used to contain light emitting diodes at one end and light detector devices at the opposite end of the same systems fiber then the systems fiber can readily communicate with each of the light detecting elements simply by removing the systems fiber core 11, as shown in FIG. 5A, from the connector tube 4 of one light detection element and into the connector tube 4 of any of the other light detection elements. This is also possible with the opposite end of the systems fiber which is connected to one connector tube out of a plurality of several connector tubes for removably connecting with separate light emitting elements.

FIG. 5A further indicates how an inoperative light emitting diode 19 could be rapidly removed from the communication system by withdrawing the systems fiber 25 from the connector tube 4 and inserting it into another connector tube 4 containing an operative light emitting diode. This was not possible with electro-optical elements in the past since the systems fiber 25 was generally cemented directly to a fiber cemented to the light emitting diode 19 so that the fiber 25 would have to be cut, removed, and respliced.

Another advantage with the electro-optical coupler shown in FIG. 5A is the direct access to the optically polished surface 10 of the connector fiber 1 in the event that the surface 10 becomes covered with a foreign substance such as dust or moisture. In this application the systems fiber 25 is removed and the connector tube 4 is slidingly disengaged from the support tube 3. The optical surface 10 of connector fiber 1 can then be cleaned and polished without in any way disturbing the optical alignment between the active region 12 of the light emitting diode 19.

In some applications it is desirable to have a plurality of light emitting diodes on a common header substrate. When several light emitting diodes are to be interconnected within an optical communications system by the method of this invention then one extended diode cap 13, such as shown in FIG. 2, for example, could contain a plurality of apertures 15 corresponding to each light emitting diode 19. Each of the diodes 19 could in turn have its own support tube 3 and its own connector fiber 1. Optical connection between one or more fibers in an optical communications system such as a telephone exchange, for example, could be made by providing each individual support tube 3 with its own connector tube 14. Interconnection between one fiber and any of the other optical fibers could be made by means of the interconnection between a single optical fiber and each of the individual connectors tubes as described earlier.

Although an electro-optical coupler is disclosed for quick connection between elements in an optical communications system this is not intended as a limitation. The electro-optical coupler of this invention finds application wherever removable coupling is required between light conducting fibers and light emitting and detecting devices.

What is claimed is:

1. A coupler for connecting an optical fiber to an electro-optical element in an optical communication system, comprising:
 a first optical fiber having a first end fixedly coupled to said electro-optical element, and having a polished second end;
 a first hollow tube for housing said first fiber, said hollow tube having an outer diameter; and
 a second hollow tube having a first inner diameter at a first end thereof, said first inner diameter substantially equal to said outer diameter so that said second hollow tube may slidably engage and pass over said first hollow tube, said second hollow tube having a second smaller inner diameter at a second end thereof for slidably receiving said optical fiber and guiding the end of said optical fiber to the polished end of said first optical fiber.

2. The coupler of claim 1 wherein said first hollow tube comprises a metal.

3. The coupler of claim 1 wherein said first hollow tube comprises a plastic.

4. The coupler of claim 1 wherein said first hollow tube comprises a glass.

5. The coupler of claim 1 wherein said second hollow tube comprises a metal.

6. The coupler of claim 1 wherein said second hollow tube comprises a plastic.

7. The coupler of claim 1 wherein said second hollow tube comprises a glass.

8. The coupler of claim 1 wherein the first hollow tube is produced by coating the first fiber.

9. The coupler of claim 1 wherein said second hollow tube is produced by sliding a first tube partway into a second tube where the first tube's outside diameter is slightly smaller than the second tube's inside diameter.

10. The coupler of claim 1 wherein said electro-optical element is a light emitting diode having a cap with an aperture therein and a header and wherein said first hollow tube is fixedly coupled to said cap within said aperture.

11. A coupler for connecting an optical fiber to an electro-optical element in an optical communication system, comprising:
 a first optical fiber having a first end fixedly coupled to said electro-optical element, and having a polished second end;
 a first hollow tube housing said first optical fiber, said hollow tube having a predetermined outer diameter and an end terminating at the polished second end of said first optical fiber; and
 a second hollow tube having a first inner diameter at a first end thereof, said first inner diameter substantially equal to said predetermined outer diameter of the first hollow member so that said second hollow tube may slidably receive and engage said first hollow tube, said second hollow tube having a second smaller inner diameter at a second end thereof for slidably receiving said optical fiber, whereby the interaction of the first inner diameter and the predetermined outer diameter and the second smaller inner diameter of the second hollow tube function to guide the end of said optical fiber to the polished end of said first optical fiber.

* * * * *